United States Patent
Yamamoto et al.

(10) Patent No.: US 6,523,432 B1
(45) Date of Patent: Feb. 25, 2003

(54) SHOCK-ABSORBING STEERING ASSEMBLY

(75) Inventors: Yoshitaka Yamamoto, Tondabayashi (JP); Koji Yoshioka, Kashiwara (JP); Noboru Minamoto, Kashihara (JP)

(73) Assignee: Koyo Seiko Co., Ltd., Osaka (JP)

( * ) Notice: Subject to any disclaimer, the term of this patent is extended or adjusted under 35 U.S.C. 154(b) by 40 days.

(21) Appl. No.: 09/655,835

(22) Filed: Sep. 6, 2000

(30) Foreign Application Priority Data

Sep. 10, 1999 (JP) .......................................... 11-257098

(51) Int. Cl.[7] ............................................... B60K 20/00
(52) U.S. Cl. ............................. 74/492; 74/493; 280/777
(58) Field of Search ........................ 74/560, 492, 493, 74/473.3, 512; 280/777, 775

(56) References Cited

U.S. PATENT DOCUMENTS

| 3,769,851 | A | * | 11/1973 | Edme et al. ................... 74/492 |
| 4,022,495 | A | * | 5/1977 | Pizzocri .................. 280/777 X |
| 4,786,076 | A | * | 11/1988 | Wierschem ................. 280/777 |
| 4,927,174 | A | * | 5/1990 | Jones ......................... 280/777 |
| 4,943,028 | A | * | 7/1990 | Hoffmann et al. ......... 74/492 X |
| 5,082,311 | A | * | 1/1992 | Melotik ...................... 280/777 |
| 5,115,691 | A | * | 5/1992 | Beauch ......................... 74/493 |
| 5,131,286 | A | * | 7/1992 | Sturges et al. ................. 74/492 |
| 5,470,107 | A | * | 11/1995 | Muntener et al. ............ 280/777 |
| 5,769,454 | A | * | 6/1998 | Duval et al. ................. 280/777 |
| 5,944,348 | A | * | 8/1999 | Boyle, III et al. ........... 280/777 |
| 5,961,146 | A | * | 10/1999 | Matsumoto et al. ........ 280/777 |
| 6,019,391 | A | * | 2/2000 | Stuedemann et al. ... 280/777 X |
| 6,149,196 | A | * | 11/2000 | Guiard et al. ................ 280/777 |
| 6,170,874 | B1 | * | 2/2001 | Fosse .......................... 280/777 |
| 6,183,012 | B1 | * | 2/2001 | Dufour et al. ............... 280/777 |
| 6,286,385 | B1 | * | 9/2001 | Nishimura et al. ......... 74/473.3 |

FOREIGN PATENT DOCUMENTS

| DE | 3433936 A | * | 3/1986 |
| JP | 05-105088 | | 4/1993 |
| JP | 06-329032 | | 11/1994 |

* cited by examiner

*Primary Examiner*—David A. Bucci
*Assistant Examiner*—Colby Hansen
(74) *Attorney, Agent, or Firm*—Smith, Gambrell & Russell, LLP (57) ABSTRACT

A lower bracket for mounting a steering column to a vehicle body is formed as a single element that is fixed to the vehicle body by inserting a bolt with a collar therethrough. Upon application of an impact load, the lower bracket forces the bolt and collar into a path of a smaller width than the collar thereby plastically deforming an edge portion of the path for absorption of the impact energy.

2 Claims, 10 Drawing Sheets

SHOCK-ABSORBING STEERING ASSEMBLY

TITLE OF THE INVENTION

Shock-absorbing steering assembly

1. Field of the Invention

The present invention relates to a shock-absorbing steering assembly mounted to a vehicle, such as an automobile, for absorbing an impact of a secondary collision between a driver and a steering wheel in an automobile collision.

2. Description of the Prior Art

There have been proposed a variety of shock-absorbing steering column assemblies for absorbing the impact of the secondary collision between the driver and the steering wheel in the automobile collision (see, for example, Japanese Unexamined Patent Publication Nos.5-105088(1993) and 6-329032(1994)). Unfortunately, the conventional shock-absorbing steering column assemblies share a common problem that a shock-absorbing structure is constructed from a large number of elements.

OBJECT AND SUMMARY OF THE INVENTION

In view of the foregoing, it is an object of the present invention to provide a shock-absorbing steering assembly with a reduced number of elements.

In accordance with the present invention, a shock-absorbing steering assembly comprises:

a steering shaft;

a steering column supporting said steering shaft; and a mounting member for retaining said steering column on a vehicle body and serving to absorb an energy of an impact load relatively applied to said steering shaft in an axial direction thereof with respect to the vehicle body, wherein said mounting member comprises:

a bracket consisting of a single element mounted to either one of said vehicle body and said steering column;

a bolt fixed to the other one of the above as engaged with said bracket; and a collar fitted on an outer periphery of said bolt, and wherein said bracket includes a bolt hole allowing said bolt and collar to pass therethrough in a direction intersection said axial direction, and a path continuous to said bolt hole to extend along said axial direction and smaller in width than said bolt hole, and an edge portion of said path is a shock absorbing portion to be plastically deformed by said collar when said bracket is relatively moved along the axial direction under said impact load, said edge portion including a deformation-inducing configuration extended parallel to said path and a previously bent in section at a predetermined angle for inducing a predetermined plastic deformation according to a predetermined impact load.

In the shock-absorbing steering assembly of the above construction, the shock absorbing portion of the bracket, as a single element, absorbs the impact energy as plastically deformed by the collar on the outer periphery of the bolt. Thus is achieved the reduced number of elements involved in the shock absorption.

Also, the edge portion in the bracket absorbs the impact energy as plastically deformed by the collar on the outer periphery of the bolt. Hence, the impact energy is more readily absorbed by the bracket of a single element.

Further, one deformation-inducing configuration provides a certain plastic deformation characteristic. This permits the bracket to be designed to exhibit a predetermined shock-absorbing characteristic according to a predetermined impact load.

In this case, the deformation-inducing configuration provides the variation of the plastic deformation characteristic. This permits the bracket to be designed to exhibit a predetermined shock-absorbing characteristic according to a predetermined impact load.

In the above shock-absorbing steering assembly, the bolt hole may be defined within a bolt insertion portion formed by curving a part of the bracket, while the shock absorbing portion may be defined by a bending plate extended from an end of the bolt insertion portion along the steering column.

In this case, the bending plate unitary with the bracket absorbs the impact energy as plastically deformed by the collar on the outer periphery of the bolt. Hence, the impact energy is more readily absorbed by the bracket of a single element.

In the above shock-absorbing steering assembly, the steering column may be mounted to the vehicle body at two places thereof by means of the mounting member and another mounting member, each of the mounting members shaped like a saddle and fixed to each place with one bolt.

In this case, the steering column is mounted to the vehicle body by fixing the two mounting members to the respective places of the vehicle body using one bolt for each mounting member, thereby facilitating the mounting operation of the assembly.

DESCRIPTION OF THE PREFERRED EMBODIMENTS

Figure 1:
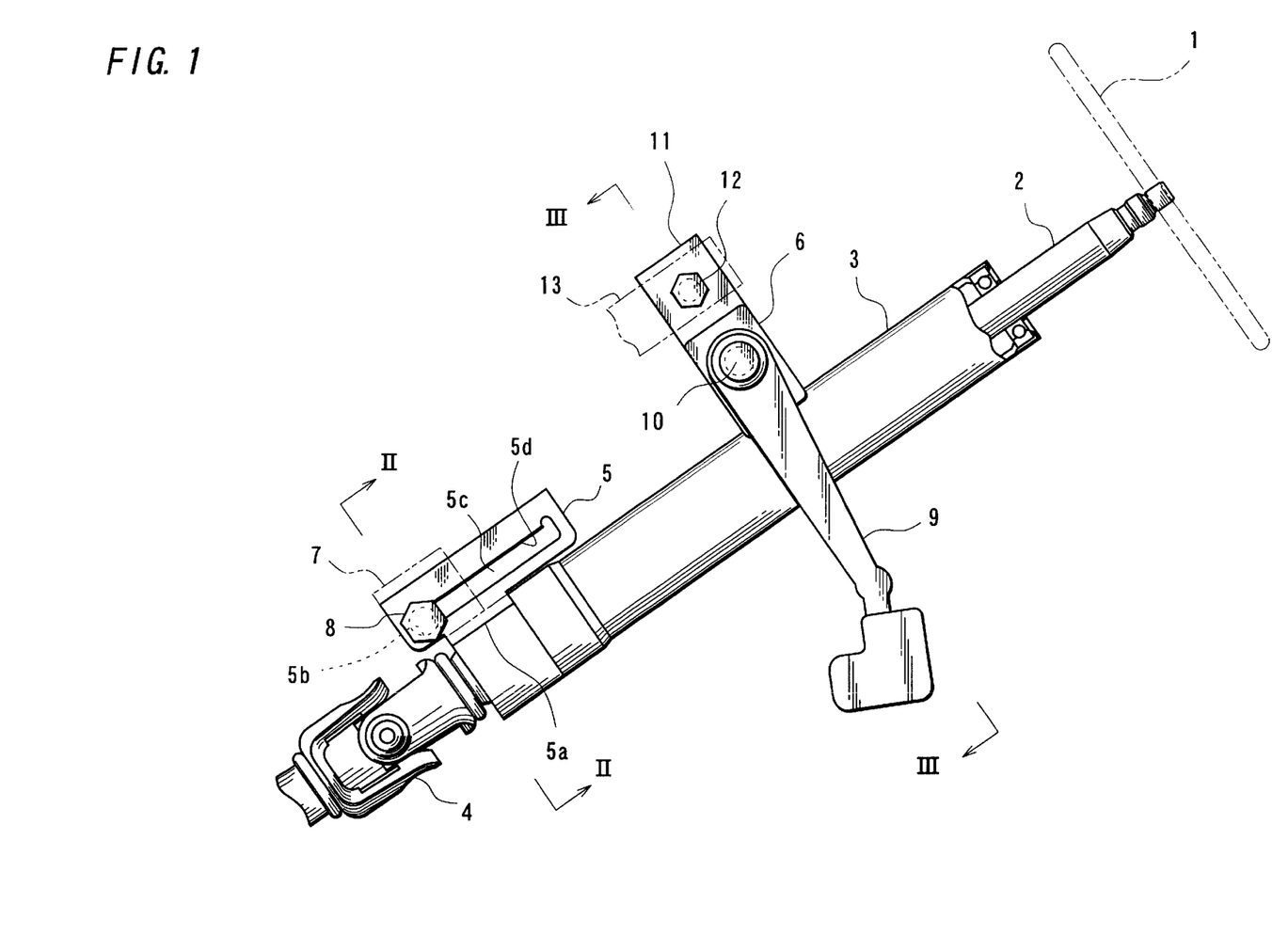
FIG. 1 is a side view showing a shock-absorbing steering assembly according to a first embodiment of the present invention.

FIG. 1 is a side view of a shock-absorbing steering assembly according to one embodiment of the present invention. Referring to the figure, a steering shaft 2 with a steering wheel 1 connected to its right end is rotatably supported by a cylindrical steering column 3. The steering shaft 2 has a universal Joint 4 connected to its left end. Soldered to the steering column 3 are a lower bracket 5 and a tilt bracket 6 serving as mounting members.

Figure 2:
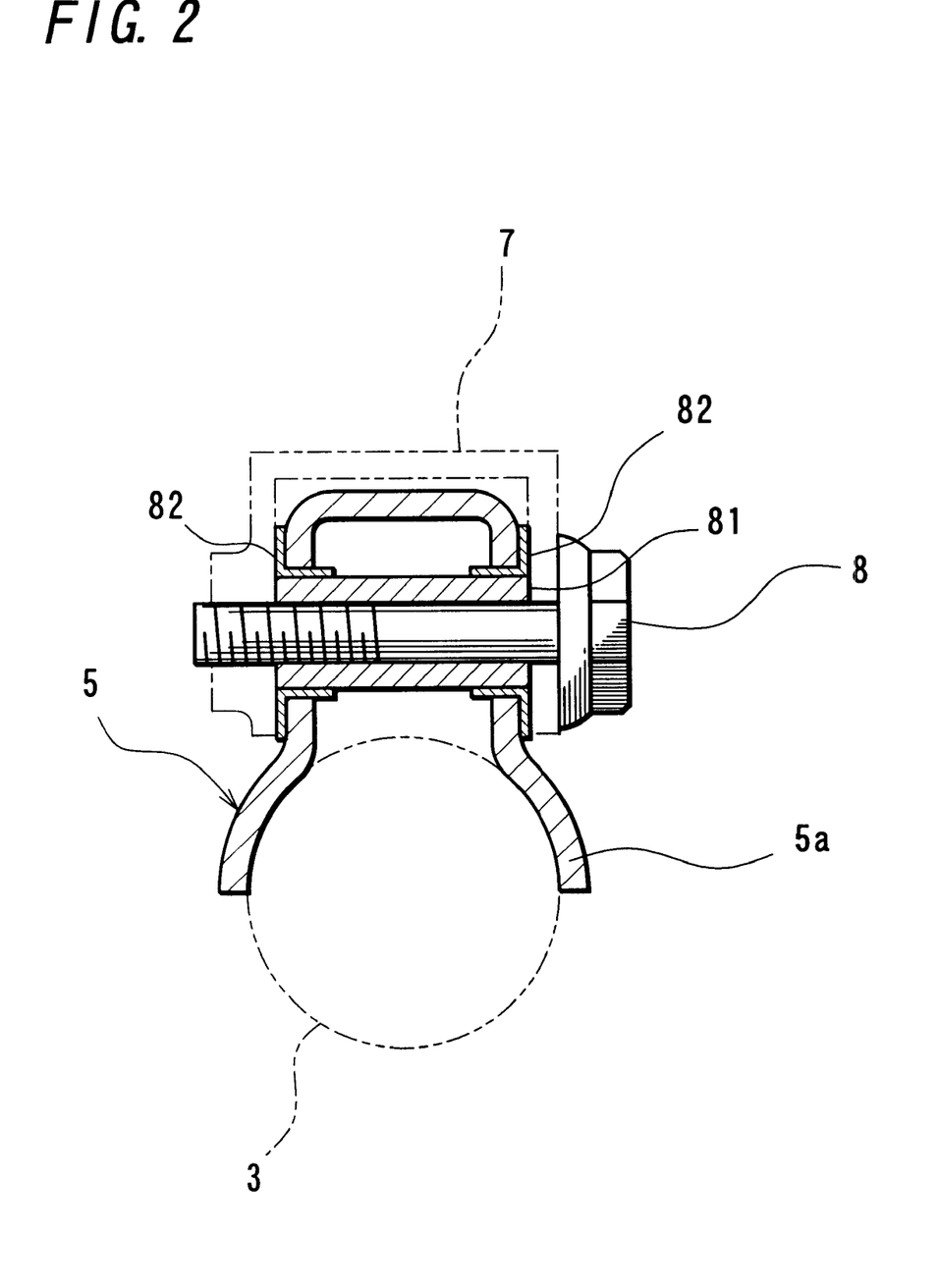
FIG. 2 is a sectional view taken on the line II—II in FIG. 1.
Figure 3:
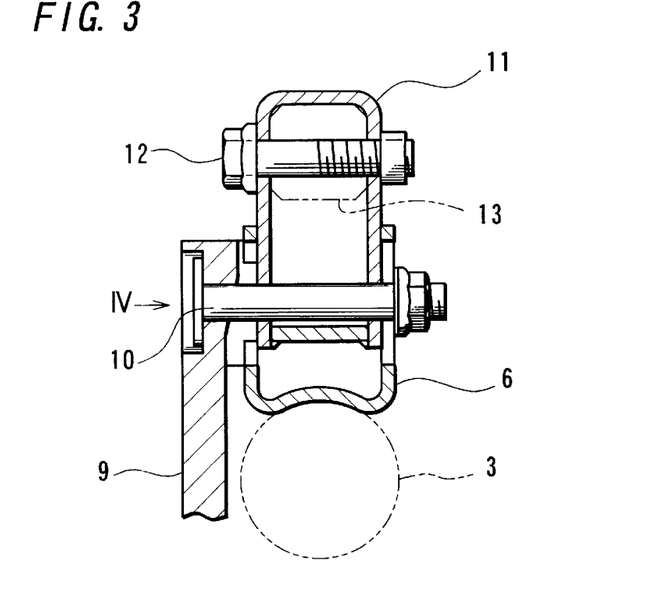
FIG. 3 is a sectional view taken on the line III—III in FIG. 1.
Figure 4:
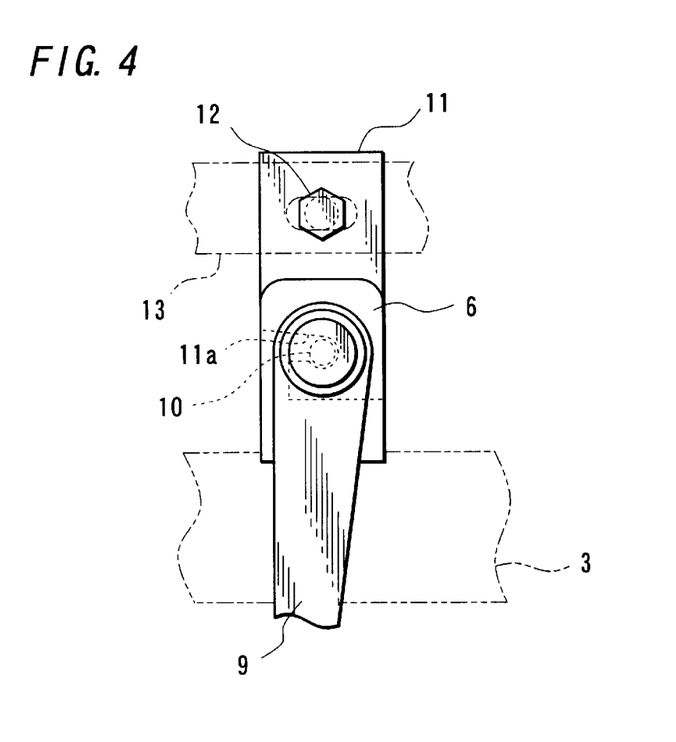
FIG. 4 is a side view as seen along the arrow IV in FIG. 3.

FIG. 2 and FIG. 3 are sectional views taken on the lines II—II and III—III in FIG. 1, respectively. FIG. 4 is a side view as seen along the arrow IV in FIG. 3. As seen in FIG. 1 and FIG. 2, the lower bracket 5 is fixed to a stationary member 7 of a vehicle body by means of a bolt 8. A collar 81 is fitted on an outer periphery of the bolt 8 while a bushing 82 is interposed between the collar 81 and the lower bracket 5. On the other hand, a tilt lever 9 for changing the inclination of the steering shaft 2 is rotatably mounted to the tilt bracket 6 by means of a tilt lever shaft 10, as shown in FIG. 1 and FIG. 3. The tilt bracket 6 also has a saddle-shaped one-way bracket 11 connected thereto by means of the tilt lever shaft 10. The one-way bracket 11 is mounted to a vehicle-side support member 13 by means of a bolt 12. The one-way bracket 11 includes a bay-shaped cutaway 11a, as shown in FIG. 4, through which the tilt lever shaft 10 is mounted. It is arranged such that the tilt lever shaft 10 disengages from the cutaway 11a at a predetermined axial impact load on the steering shaft 2, thereby releasing the tilt bracket 6 from the vehicle body.

Figure 5:
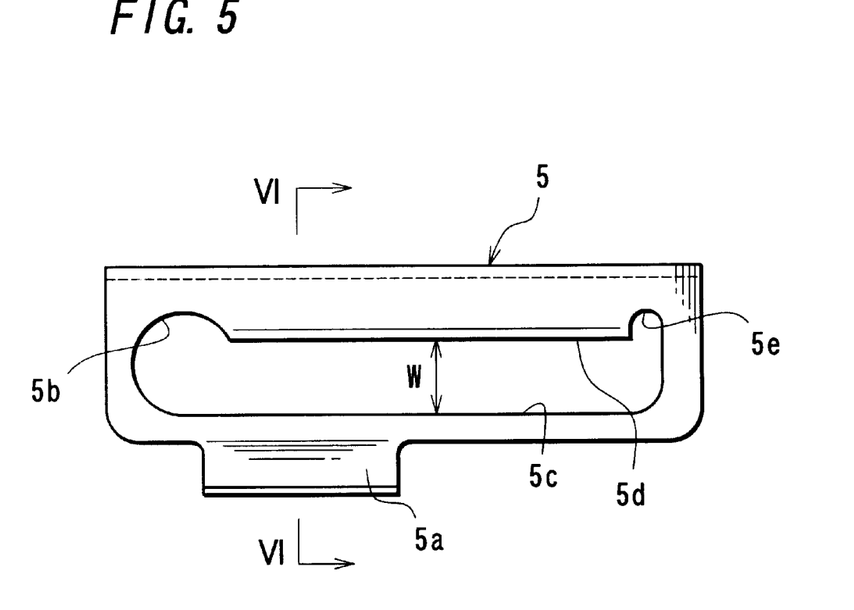
FIG. 5 is a side view showing a lower bracket, as a single element, according to the first embodiment.
Figure 6:
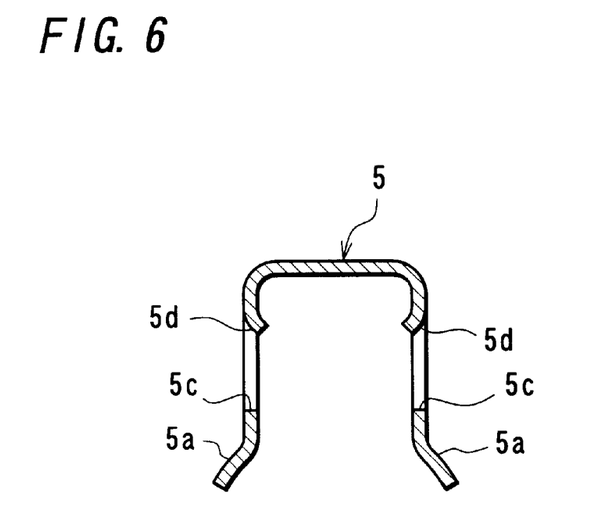
FIG. 6 is a sectional view taken on the line VI—VI in FIG. 5.

FIG. 5 is a side view showing the lower bracket 5 of a single element, and FIG. 6 is a sectional view taken on the line VI—VI in FIG. 5. As seen in the figure, the lower bracket 5 is a single element formed from a steel plate into the shape of a saddle and is soldered to the steering column 3 at its fixing seats 5a projecting diagonally outwardly from lower ends thereof. The lower bracket 5 includes bolt holes 5b in opposite sides thereof for insertion of a bolt. The pair of bolt holes 5b are aligned in a direction orthogonal to an axis of the steering shaft 2 (a perpendicular direction viewing the drawing), for allowing the bolt 8 to penetrate therethrough via the collar 81 (see FIG. 2). The lower bracket 5 further includes a linear path 5c extended rightwardly as seen in FIG. 5 in a connected relation with the bolt hole 5b and having a smaller width than the bolt hole 5b. The path 5c extends axially of the steering shaft 2 when the lower bracket 5 is mounted to the steering column 3. The path 5c has a width W slightly smaller than an outside diameter of the collar 81. Therefore, it is normally impossible to push the collar 81 into the path 5c. An upper edge portion (shock absorbing portion) 5d of the path 5c is bent inwardly at a predetermined angle (e.g., 45°) by providing a recess 5e at an upper part of the right end of the path 5c, as shown in FIG. 6. The width W of the path 5c, the predetermined angle of the upper edge portion 5d and the thickness of the lower bracket 5 are designed to meet a shock absorbing characteristics required.

In the shock-absorbing steering assembly of the above construction, when a driver bumps his body against the steering wheel 1 at an impact load of above a predetermined value in an automobile collision, the impact load is applied to the steering column 3 in its axial direction (the same as the axial direction of the steering shaft 2) via the steering shaft 2. Thus, the impact load is applied to the tilt bracket 6, and thereby the tilt bracket 6 is released from the one-way bracket 11. On the other hand, the lower bracket 5 also receives the impact load to press strongly the bolt 8 and collar 81 in parallel with the axial direction. This causes the bolt 8 and collar 81 to relatively move into the path 5c as plastically deforming the edge portion 5d thereof inwardly. At this time, the impact energy is absorbed by the bending of the edge portion 5d. The bolt 8 and collar 81 are forced into the path 5c to such a point that the total impact energy is absorbed and thus, a continuous bending of the edge portion 5d results.

The shock-absorbing steering assembly is adapted to absorb the impact energy by way of a combination of the lower bracket 5 of a single element, and the bolt 8 with the collar 81. Therefore, the number of elements involved in the impact absorption is minimum. Additionally, the inventive assembly is readily mounted to the vehicle body because the mounting thereof can be accomplished using only two bolts 8 and 12.

Figure 7:
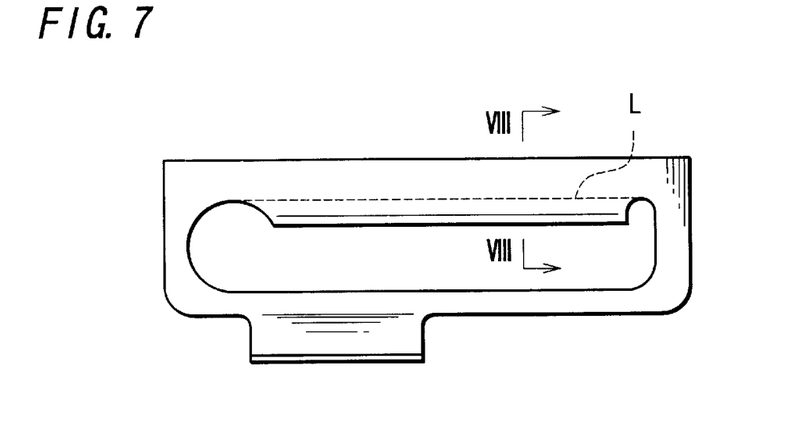
FIG. 7 is a side view showing another exemplary lower bracket according to the first embodiment.
Figure 8:
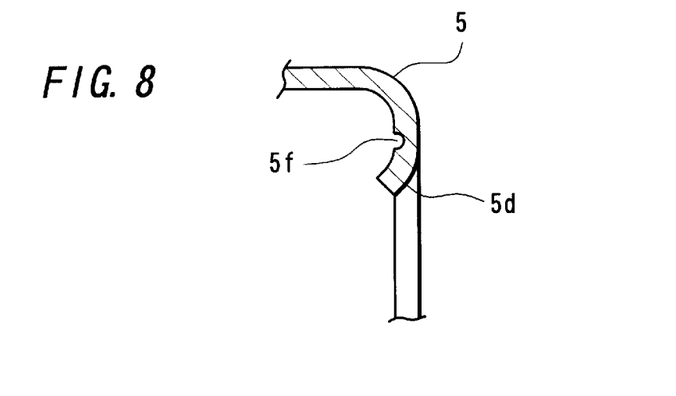
FIG. 8 is a sectional view taken on the line VIII—VIII in FIG. 7.

In the aforementioned lower bracket 5, the edge portion 5d, previously bent inward, is a kind of configuration for inducing plastic deformation in a predetermined direction thereby achieving a predetermined shock absorbing characteristic. If required, an additional deformation-inducing configuration may be provided for further promoting the plastic deformation. FIG. 7 is a side view showing one example of such an additional configuration, and FIG. 8 is a sectional view taken on the line VIII—VIII in FIG. 7. As shown in FIG. 7, this configuration is intended to produce a portion of a lower mechanical strength by forming a groove 5f in an inside surface of the edge portion 5d, the groove defining a bending line L along which the plastic deformation develops. This always permits a predetermined impact load to produce a predetermined plastic deformation, thus ensuring a predetermined shock absorbing characteristic.

Figure 9:
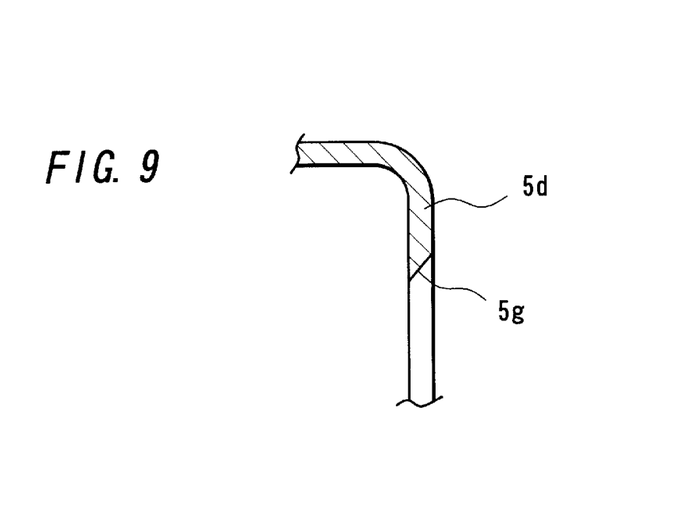
FIG. 9 is a sectional view showing still another exemplary lower bracket according to the first embodiment as seen along the same direction as in FIG. 8.

FIG. 9 illustrates another example of the deformation-inducing configuration as seen along the same direction as in FIG. 8. In this case, the edge portion 5d is previously formed with a taper 5g at its end surface rather than bent inwardly. Because of the inclination of the tapered portion 5g, the edge portion is gradually reduced in thickness toward its tip. Therefore, the edge portion 5d is plastically deformed as pressed against the collar 81 around the bolt 8.

In the above embodiment, the path 5c in the lower bracket 5 has a constant width W. In this case, there is a linear relationship between the stroke of a relative movement of the collar 81 and the amount of impact energy absorbed. The ratio of increase in the absorbed energy relative to the stroke increase may be increased by, for example, configuring the path 5c to be progressively decreased in width W with increase in the stroke.

The above embodiment is designed to absorb the impact energy by way of the lower bracket 5, which may be replaced by an upper bracket of a similar configuration mounted to the tilt lever shaft 10.

Figure 10:
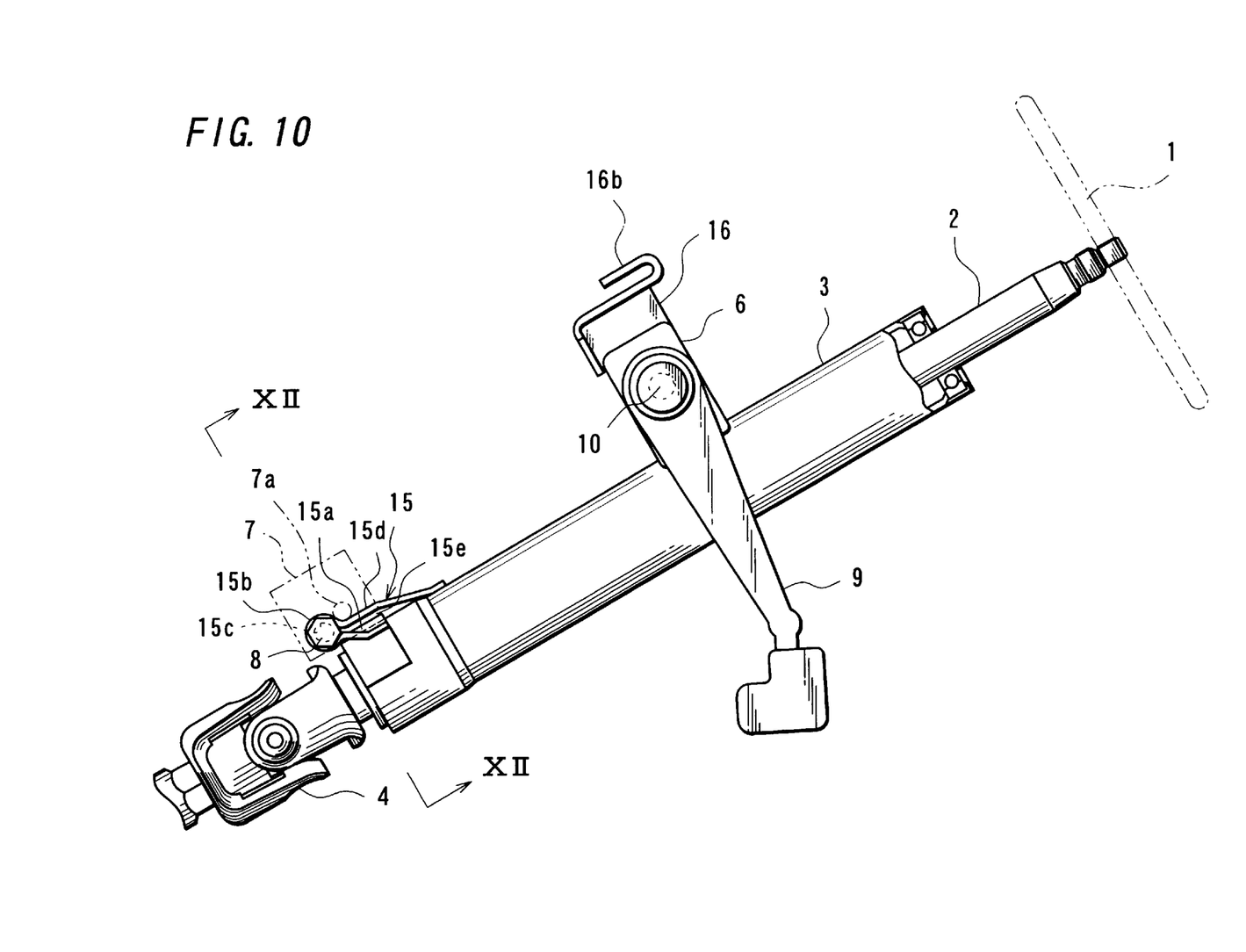
FIG. 10 is a side view showing a shock-absorbing steering assembly according to a second embodiment hereof.
Figure 11:
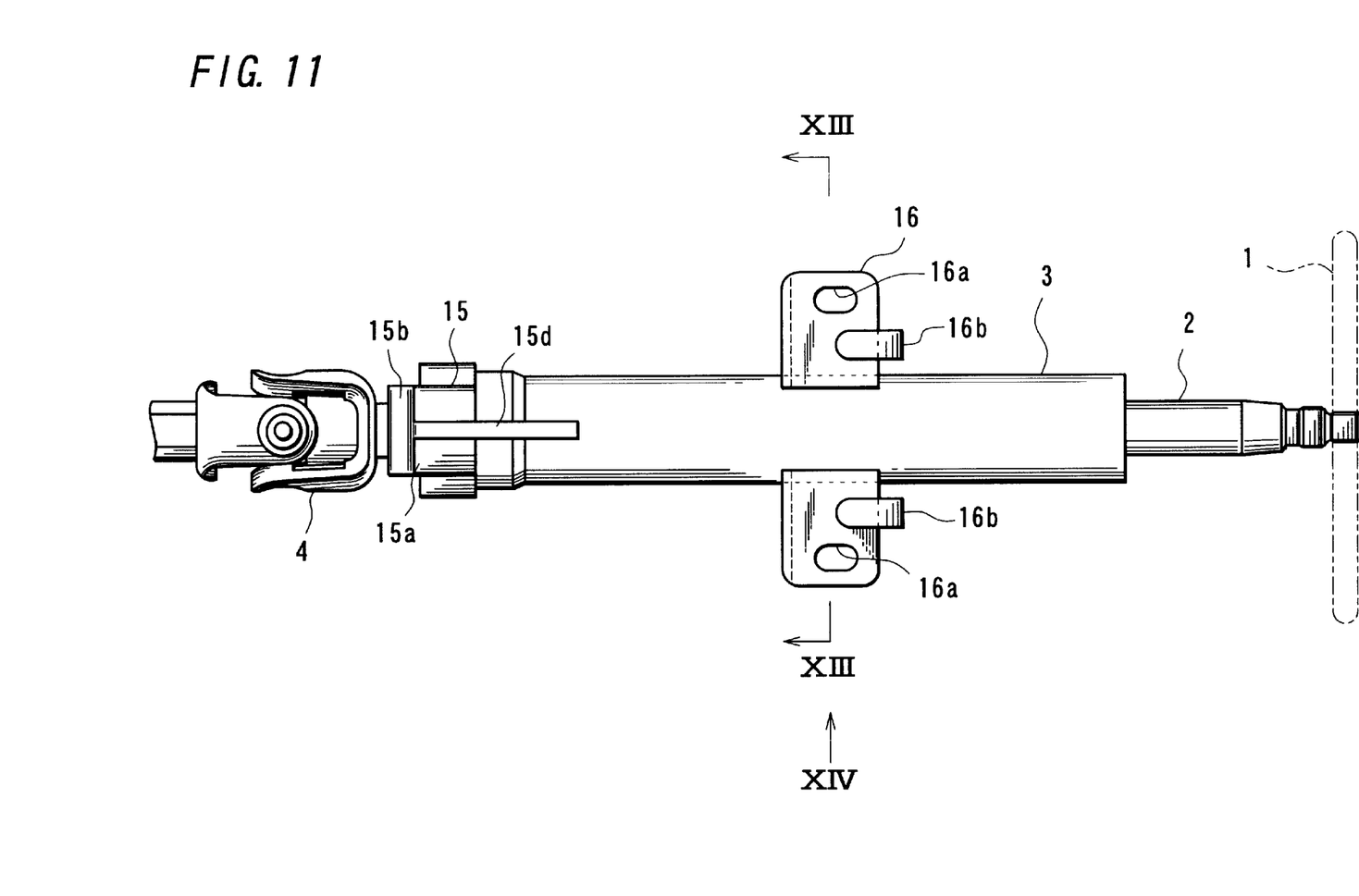
FIG. 11 is a plan view showing the shock-absorbing steering assembly according to the second embodiment.
Figure 12:
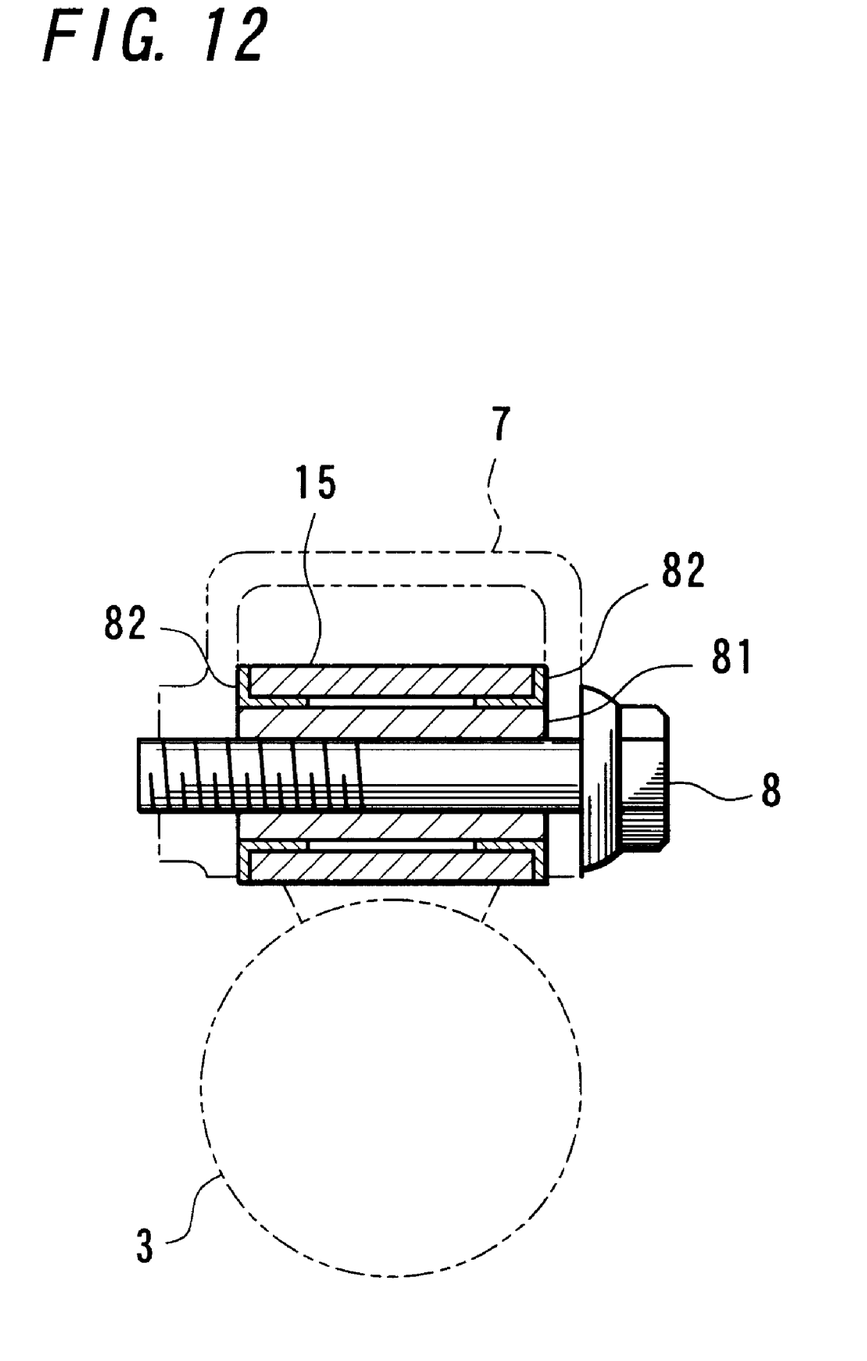
FIG. 12 is a sectional view taken on the line XII—XII in FIG. 10.
Figure 13:
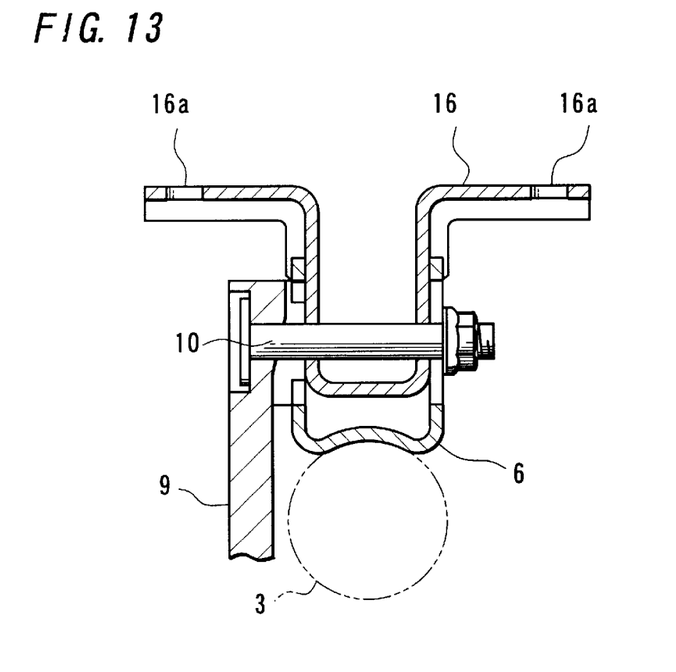
FIG. 13 is a sectional view taken on the line XIII—XIII in FIG. 11.
Figure 14:
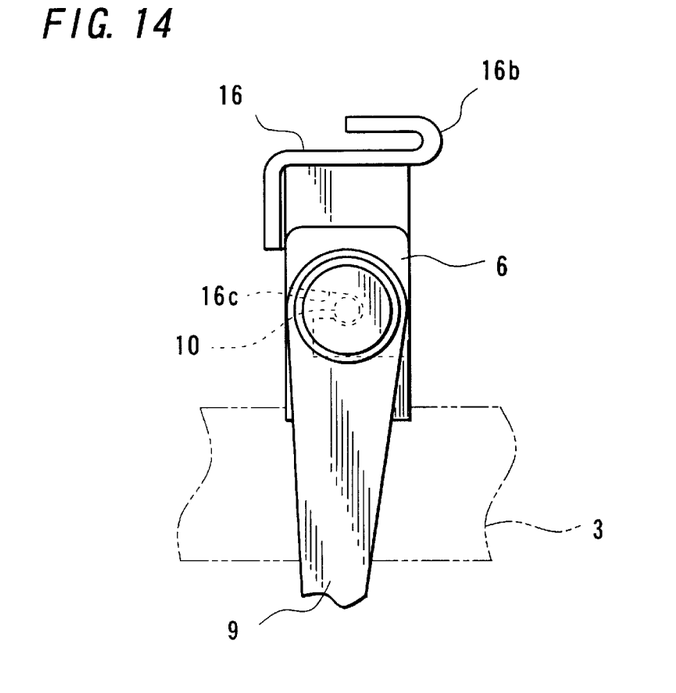
FIG. 14 is a side view as seen along the arrow XIV in FIG. 11.

FIG. 10 to FIG. 16 illustrate a shock-absorbing steering assembly according to a second embodiment hereof. FIG. 10 and FIG. 11 are a side view and plan view showing this assembly. FIG. 12 is a sectional view taken on the line XII—XII in FIG. 10. FIG. 13 is a sectional view taken on the line XIII—XIII in FIG. 11, and FIG. 14 is a side elevation viewed along the arrow XIV in FIG. 11. In this assembly, like reference characters to those of the first embodiment represent like parts of the first embodiment, respectively. Referring to FIG. 10, a lower bracket 15, as the mounting member, is fixed to the stationary member 7 of the vehicle body by means of the bolt 8. The lower bracket 15 is pressed against a vehicle-side fixed member 7a. As seen in FIG. 12, the collar 81 is fitted on an outer periphery of the bolt 8, whereas the bushing 82 is interposed between the collar 81 and the lower bracket 15.

Figure 15:
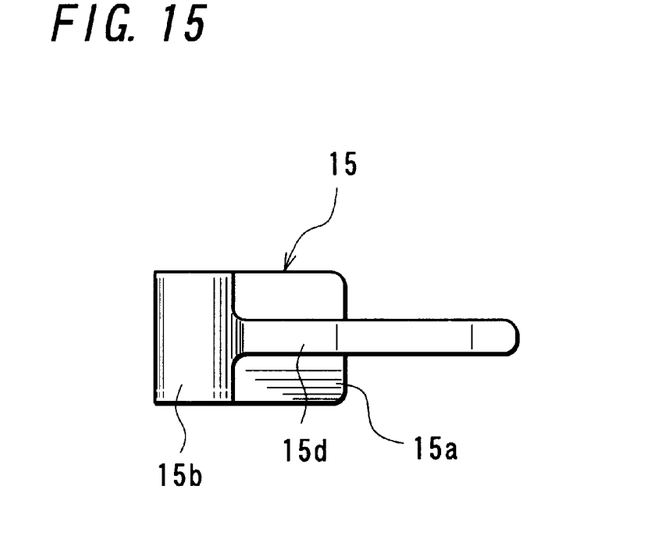
FIG. 15 is a plan view showing a lower bracket according to the second embodiment.
Figure 16:
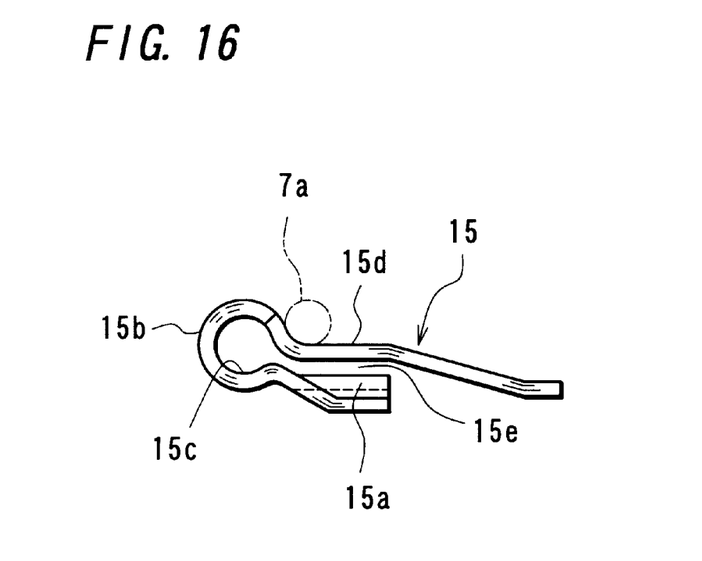
FIG. 16 is a side view showing the lower bracket according to the second embodiment.

FIG. 15 and FIG. 16 are a plan view and side view showing the lower bracket 15. The lower bracket 15 of this embodiment is a single element constructed from a steel plate slightly thicker than the lower bracket 5 of the first embodiment and having a shape shown in the figures. Referring to the figures, a mounting seat 15a at one end of the lower bracket 15 is formed into a curved face in conformity with an external shape of the steering column 3. The lower bracket 15 further includes a bolt insertion portion 15b formed by curving into a tubular shape a portion extended from a proximal end of the mounting seat 15b. An interior of the bolt insertion portion 15b defines a bolt hole 15c through which the bolt 8 passes via the collar 81. A bending plate (shock absorbing portion) 15d is extended in a strip fashion from an end of the bolt insertion portion 15b and abuts against the vehicle-side member 7a. As seen in FIG. 10, the bending plate 15d extends along the steering column 3 to define a gap 15e between itself and the steering column 3, the gap 5e being continuous to the bolt hole 15c and having a width smaller than the bolt hole 15c. The bending plate 15d has its end soldered to the steering column 3. The axial movement of the steering column 3 is normally inhibited by the bolt 8 and collar 81 inserted through the bolt hole 15c. The curvature and thickness of the bending plate 15d are designed to meet a shock absorbing characteristic required.

On the other hand, a one-way bracket 16 is connected to the tilt bracket 6 via the tilt lever shaft 10, as shown in FIG. 10 and FIG. 11. The one-way bracket 16 includes two mount holes 16a (FIG. 11), through which the bolt (not shown) is inserted to fix the one-way bracket 16 to the vehicle body. The one-way bracket 16 is also integrally provided with a pair of hooks 16b on its top. The whole body of the column assembly may be hung on the vehicle body by bringing these hooks 16b into engagement with respective corresponding parts of the vehicle body. Specifically, after temporarily fixed to place, the column assembly has its lower bracket 15 fixed to the vehicle side by means of the bolt 8 as well as its one-way bracket 16 fixed to the vehicle side by means of the bolt. This eliminates a cumbersome step of tightening the bolts from below with the whole body of the column assembly supported with hand, resulting in a facile mounting operation. Similarly to the first embodiment, the one-way bracket 16 includes a cutaway 16c shown in FIG. 14, through which the tilt lever shaft 10 is inserted. It is arranged such that upon application of a predetermined axial impact load to the steering shaft 2, the one-way bracket 16 remains on the vehicle side while the tilt bracket 6 is released from the vehicle side.

In the shock-absorbing steering assembly of the second embodiment, when the driver bumps his body against the steering wheel 1 at an impact load of above a predetermined value in the automobile collision, the impact load is applied to the steering column 3 in its axial direction via the steering shaft 2. Thus the impact load is applied to the tilt bracket 6, and thereby the tilt bracket 6 is released from the vehicle body. On the other hand, the impact load is also applied to the lower bracket 15, and thereby the lower bracket 15 strongly presses the bolt 8 and collar 81 in parallel with the axial direction of the steering shaft. 2. As a result, the bending plate 15d is plastically deformed by the collar 81 and the vehicle-side member 7a. This plastic deformation absorbs the impact energy. The bending plate 15d is plastically deformed to such a point that the total impact energy is absorbed and hence, the steering column 3 stops moving.

Similarly to the first embodiment, the above shock-absorbing steering assembly is adapted to absorb the impact energy by way of a combination of the lower bracket 15 of a single element, the bolt 8 with the collar 81, and the vehicle-side member 7a. Thus, the number of elements involved in the impact absorption is minimum. Since the column assembly can be temporarily fixed to place when mounted to the vehicle, a facile mounting operation results. In addition, the hooks 16b are unitary with the one-way bracket 16, eliminating the increase in the number of elements.

The foregoing embodiments are arranged such that lower bracket 5 or 15 is fixed to the steering column 3 while the bolt 8 and collar 81 are fixed to the vehicle body. Alternatively, the lower bracket 5 or 15 may be fixed to the vehicle body while the bolt 8 and collar 81 may be fixed to the steering column 3.

What is claimed is:

1. A shock-absorbing steering assembly comprising:

a steering shaft;

a steering column supporting said steering shaft; and a mounting member for retaining said steering column on a vehicle body and serving to absorb energy of an impact load relatively applied to said steering shaft in an axial direction thereof with respect to the vehicle body, wherein said mounting member comprises:
   a bracket consisting of a single element mounted to either one of said vehicle body and said steering column;
   a bolt fixed to the other one of the above as engaged with said bracket; and
   a collar fitted on an outer periphery of said bolt, and wherein
     said bracket includes a bolt hole allowing said bolt and collar to pass therethrough in a direction intersecting said axial direction, and a path continuous to said bolt hole and extending along said axial direction and smaller in width than said bolt hole, and
     an edge portion of said path being a shock absorbing portion to be plastically deformed by said collar when said bracket is relatively moved along the axial direction under said impact load, said edge portion including a deformation-inducing configuration extended parallel to said path and a previously bent in section at a predetermined angle for inducing a predetermined plastic deformation according to a predetermined impact load.

2. The shock-absorbing steering assembly as claimed in claim 1, wherein said steering column is mounted to the vehicle body at two places thereof by means of said mounting member and another mounting member, each of the mounting members shaped like a saddle and fixed to each place with one bolt.

* * * * *

UNITED STATES PATENT AND TRADEMARK OFFICE
CERTIFICATE OF CORRECTION

PATENT NO. : 6,523,432 B1
DATED : February 25, 2003
INVENTOR(S) : Yamamoto, Yoshitaka et al.

It is certified that error appears in the above-identified patent and that said Letters Patent is hereby corrected as shown below:

<u>Title page,</u>
Item [75], Inventors, please correct the Inventor section to read as follows:
-- Yoshitaka Yamamoto, Osaka (JP); Koji Yoshioka, Osaka (JP);
Noboru Minamoto, Nara (JP) --

Signed and Sealed this

Ninth Day of September, 2003

JAMES E. ROGAN
*Director of the United States Patent and Trademark Office*